June 24, 1924.
W. F. FARNSWORTH
KEEFER FOR NUTS
Filed March 20, 1922
1,498,686
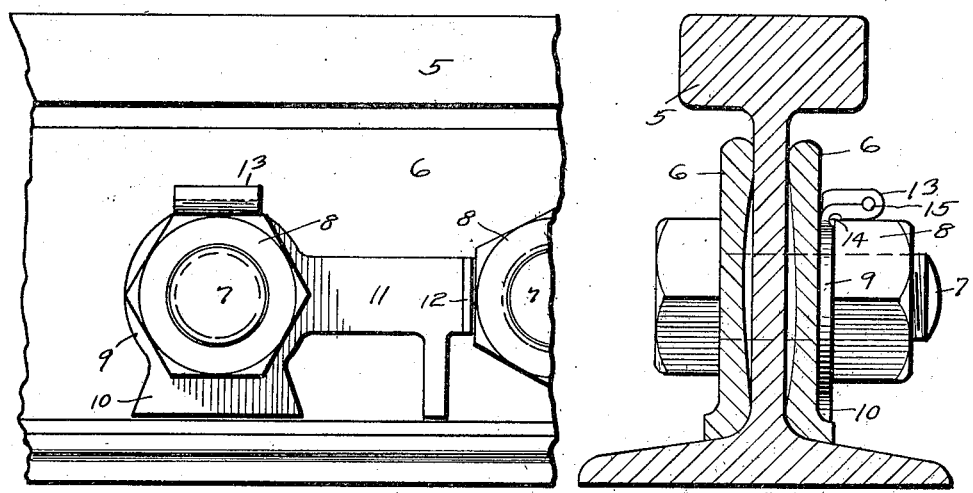
Fig. 1.
Fig. 2.
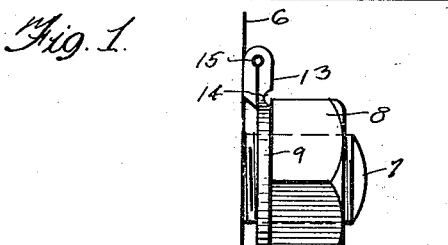
Fig. 5.
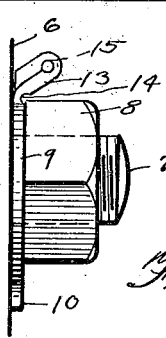
Fig. 6.
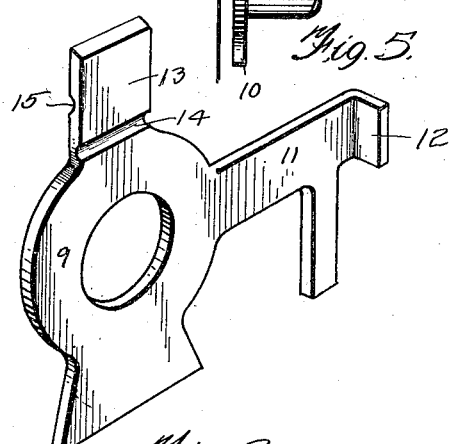
Fig. 3.
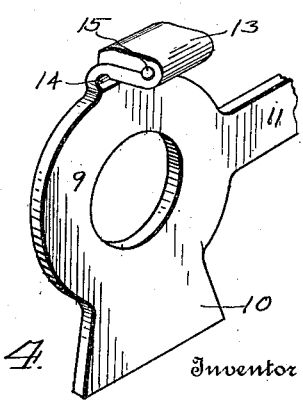
Fig. 4.
Inventor
William F. Farnsworth,
By James N. Cyler
Attorney Patented June 24, 1924.

1,498,686

UNITED STATES PATENT OFFICE.

WILLIAM F. FARNSWORTH, OF WASHINGTON, DISTRICT OF COLUMBIA.

KEEPER FOR NUTS.

Application filed March 20, 1922. Serial No. 545,144.

*To all whom it may concern:*

Be it known that WILLIAM F. FARNSWORTH, a citizen of the United States, residing at Washington, in the District of Columbia, has invented certain new and useful Improvements in Keepers for Nuts, of which the following is a specification.

This invention relates to a keeper, adapted to hold a plurality of nuts against turning, with respect to the bolts on which they are threaded.

An object of the invention is to provide such a device, which will be firmly held by one nut, and having means formed integral therewith for engagement with the side of a second nut.

A further object of the invention is the provision of means for holding a plurality of nuts against turning, said means having legs for engagement with a fish plate of a railway rail joint to prevent said means from turning.

A further important object of the invention is the provision of a keeper for a plurality of nuts which is extremely simple in construction, strong, durable and highly convenient in use.

Other important objects and advantages of the invention will be apparent during the course of the following description.

In the accompanying drawings,

Figure 1, is a side elevation of a railway rail joint, showing a plurality of nuts associated therewith, and illustrating the invention applied thereto, Figure 2, is a transverse section through the rail joint, also showing the invention applied thereto, Figure 3, is a perspective view of the keeper, as stamped out at the time of manufacture, Figure 4, is a similar view but showing the keeper after it has been bent for engagement with a nut, Figure 5, is an edge view of the keeper as applied to a bolt, and before the nut has been turned up tight, and, Figure 6, is a similar view after the nut has been turned up tight and the tongue of the keeper has been forced away from the fishplate.

Referring to the drawings in detail, the numeral 5 designates a railway rail, provided with the usual fish plates 6. The fish plates and the rail are provided with holes for the reception of bolts 7, said bolts being threaded for the reception of nuts 8. Only two bolts and two nuts have been shown, although the invention is applicable to a large number.

The numeral 9 designates the body portion of the keeper, which is of washer formation, and is provided with a central opening to be traversed by a bolt. A leg 10 is formed upon the lower edge of the keeper, which leg is adapted to engage with a part of the fish plate, as shown in Figure 2, to prevent the keeper from turning after being applied to the bolt. An arm 11 is formed integral with the keeper upon one side, and has its end turned upward as shown at 12. This arm is adapted to engage with the side of the nut next to the nut which engages with the keeper. A tongue 13 is formed integral with the keeper at its top, and as clearly shown the tongue is provided with grooves 14 and 15. The groove 14 is formed in the tongue adjacent the point of engagement with the body portion, and the groove 15 is formed in the opposite side of the tongue about half way of its length. The object of the grooves is to facilitate the bending of the tongue, such grooves relieving to a degree the stress on the metal at these points, when the bending takes place. The object of bending the tongue upon itself, is so that the free end will lie directly over the first bend to reinforce the point of first bending, by reason of the fact that the free end abuts the fish plate and serves as a brace. The purpose of forming the groove 15 is to also facilitate the bending of said tongue and so that the end will lie tightly against the lower part. It is to be understood that applicant is aware of the many patents relating to washers having bent tongues, but none so far as he is able to find have ever used a tongue of this nature. One of the great objections to bent tongues, is that they so frequently break off.

In operation, when it is desired to lock a pair of nuts upon their respective bolts, one nut is first turned up tight, and so that one of its flat sides is arranged vertically. The keeper is then placed upon the second bolt, the leg 10 engaging with the fish plate, and the arm 11 and end 12 engaging with the side of the nut just mentioned. The second nut is then placed upon the bolt, and before turning up tight, will assume the position shown in Figure 5. As the nut is then forced up tight, the tongue 13 will be forced slightly away from the fish plate. The nut is turned as tight as possible, until one of its flat sides is arranged horizontally. A suitable tool, not shown, is then placed behind the tongue, and said tongue is forced upwardly until it firmly binds against the nut. The groove 14 fits over the edge of the nut and allows the tongue to engage the nut for its full length. The groove 14 will allow the keeper being placed on and removed from bolts many times without the danger of the tongue breaking from bending. The arm 11 will firmly hold the first nut against turning, due to the outturned end 12. The leg will positively prevent the keeper turning bodily with respect to the bolt.

It will be seen from the foregoing that an extremely simple form of keeper has been provided, one which will allow of ready removal from the bolt, while at the same time reducing to a minimum the danger of breaking the tongue, so that the said keeper may be used a number of times.

It is to be understood that the form of the invention herewith shown and described is to be taken as the preferred form thereof, but that various changes in the shape, size and arrangement of parts may be resorted to without departing from the spirit of the invention or the scope of the subjoined claims.

Having described my invention, what I claim is:

1. A device of the character described for holding a plurality of aligned nuts upon a rail joint against turning which consists of a plate traversed by one of the bolts of the rail joint, and held against movement by one of the said nuts, legs formed integral with the plate for engagement with the rail joint, an arm formed integral with the plate for engagement with a second nut, a tongue formed integral with the plate and adapted to engage with the side of the adjacent nut, reinforcing means formed integral with the said tongue to prevent accidental bending thereof.

2. A keeper of the character described for holding a plurality of nuts against turning on their respective bolts comprising a body portion having a centrally disposed opening provided therein to be traversed by a bolt, a leg formed upon the said body portion at its bottom, an arm formed upon the said body portion at one side and extended a sufficient length for engagement with the next adjacent nut, a locking tongue formed integral with the body portion at its top, and adapted to be bent into engagement with a nut, said tongue provided with a plurality of grooves to allow the easy bending thereof whereby breakage at these points of bending is reduced to a minimum.

In testimony whereof I affix my signature.

WILLIAM F. FARNSWORTH.